(12) United States Patent
Buida et al.

(10) Patent No.: US 12,143,388 B2
(45) Date of Patent: Nov. 12, 2024

(54) SYSTEM AND METHOD FOR SECURELY CONNECTING A TEST AND MEASUREMENT INSTRUMENT TO A WEB SERVICE

(71) Applicant: Initial State Technologies, Inc., Nashville, TN (US)

(72) Inventors: Thomas Buida, Nashville, TN (US); Adam M. Reeves, Nashville, TN (US); Frederick B. Kuhlman, III, Nashville, TN (US); Mark Anderson Smith, Portland, OR (US)

(73) Assignee: Initial State Technologies, Inc., Nashville, TN (US)

( * ) Notice: Subject to any disclaimer, the term of this patent is extended or adjusted under 35 U.S.C. 154(b) by 397 days.

(21) Appl. No.: 17/491,227

(22) Filed: Sep. 30, 2021

(65) Prior Publication Data

US 2022/0174068 A1 Jun. 2, 2022

Related U.S. Application Data

(60) Provisional application No. 63/120,060, filed on Dec. 1, 2020.

(51) Int. Cl.
*H04L 9/40* (2022.01)
*G06F 21/31* (2013.01)

(52) U.S. Cl.
CPC .......... *H04L 63/102* (2013.01); *G06F 21/31* (2013.01); *H04L 63/062* (2013.01); *H04L 63/08* (2013.01); *H04L 63/108* (2013.01)

(58) Field of Classification Search
CPC ..... H04L 63/102; H04L 63/062; H04L 63/08; H04L 63/108; H04L 63/067; H04L 67/12; H04L 63/0838; H04L 63/083; H04L 9/0863; H04L 63/10; G06F 21/31
See application file for complete search history.

(56) References Cited

U.S. PATENT DOCUMENTS

| 9,391,782 | B1 * | 7/2016 | Mironenko | G09C 5/00 |
| 9,661,495 | B2 * | 5/2017 | Hawkins | H04W 4/80 |
| 9,830,445 | B1 * | 11/2017 | Machani | G06F 21/32 |
| 10,003,971 | B2 * | 6/2018 | Sanders | H04W 12/06 |
| 10,530,582 | B2 * | 1/2020 | Hon | H04L 63/083 |
| 10,812,476 | B2 * | 10/2020 | Alexander | H04L 63/0853 |
| 11,532,220 | B2 * | 12/2022 | Kuhlman, III | H04N 23/661 |
| 2014/0250518 | A1 * | 9/2014 | Schneider | G06F 21/34 726/9 |

(Continued)

FOREIGN PATENT DOCUMENTS

| KR | 101450013 B1 * | 10/2014 | ............ H04L 9/32 |
| WO | WO-2020004486 A1 * | 1/2020 | ......... G06Q 20/3221 |

*Primary Examiner* — Christopher A Revak
(74) *Attorney, Agent, or Firm* — Miller Nash LLP; Andrew J. Harrington (57) ABSTRACT

A test and measurement system that allows a user to use an activation code coupled with a user-owned communication device to provide security credentials to cloud or web-based services with security enhancements or preferences. The test and measurement system includes a test and measurement instrument that can initiate the connection and a remote server which provide an activation code for a user to enter on the communication device to connect the test and measurement instrument to the cloud or web-based services.

20 Claims, 4 Drawing Sheets

(56) References Cited

U.S. PATENT DOCUMENTS

| | | | | |
|---|---|---|---|---|
| 2016/0050205 | A1* | 2/2016 | Heller | H04L 63/10 |
| | | | | 726/4 |
| 2022/0337595 | A1* | 10/2022 | Malik | H04L 63/0807 |
| 2023/0006996 | A1* | 1/2023 | Diehl | H04L 63/0807 |

* cited by examiner

SYSTEM AND METHOD FOR SECURELY CONNECTING A TEST AND MEASUREMENT INSTRUMENT TO A WEB SERVICE

PRIORITY

This disclosure claims benefit of U.S. Provisional Application No. 63/120,060, titled "SYSTEM AND METHOD FOR SECURELY CONNECTING A TEST AND MEASUREMENT INSTRUMENT TO A WEB SERVICE," filed on Dec. 1, 2020, the disclosure of which is incorporated herein by reference in its entirety.

TECHNICAL FIELD

This disclosure is directed to systems and methods related to test and measurement systems, and in particular, to techniques for securely connecting a test and measurement instrument to a cloud or web-based service.

BACKGROUND

Test and measurement instruments, such as oscilloscopes, network analyzers, etc., sometimes need a secure and efficient method for connecting to cloud services, remote databases, and other application program interface (API) driven web services that enhance the usability, functionality, and/or capabilities of the test and measurement instrument.

Typically, a test and measurement instrument user gains secure access by providing a username, password, and/or some additional "factors," such as a short message service (SMS) code, email confirmation, security question, paired authenticator application, and/or other "two-factor" authentication methods.

However, test and measurement instruments are notoriously poor at allowing users to type tedious arbitrary numbers, symbols, and characters that are often needed for usernames and passwords.

Examples of the disclosure address these and other deficiencies of the prior art.

BRIEF DESCRIPTION OF THE DRAWINGS

Aspects, features and advantages of examples of the present disclosure will become apparent from the following description of examples in reference to the appended drawings in which.

DESCRIPTION

Disclosed herein is a test and measurement system that can allow a user to use an activation code coupled with a user-owned communication device to provide security credentials to cloud or web-based services with security enhancements or preferences.

The following discussion will use several terms to encompass various topics. The term "communication device" means a device, such as a smartphone, tablets, computing devices, or future devices that may take the place of smartphones and/or tablets that can communicate with a cloud or remote server. The communications device has at least one communications link that allows the device to communicate with a test and measurement instrument, at least as far as sending a message to the instrument, and may use that same or other communications link to communicate with a remote server or storage. The communications device has a processor that executes code that enables it to communicate, a camera or other imaging sensor, an actuator to activate the camera/imaging sensor, and a memory.

The term "instrument" as used here means a device that gathers and/or generates data, such as, but not limited to, a test and measurement instrument, such as an oscilloscope, spectrum analyzer, network analyzer, signal generator, various kinds of meters, etc., and/or a sensor that gathers some sort of environmental data, such as temperature, wind speed, humidity, light intensity, sound levels, etc. These are just some examples and are in no way intended to limit the discussion to these particular examples.

The term "instrument data" means the data that the instrument has gathered and may include, but is not limited to: the instrument configuration and/or settings of any instrument involved in the set up; screen shots of the display of the instrument or instruments; the model and serial number of the instrument or instruments; a particular test or a particular step of a test that the instrument is performing on a device under test; the structured waveform applied to, or acquired from, the device under test; and the state of the instrument such as the CPU load, instrument set up information, enabled software licenses on the instrument, any other state-based information. In the case of a measurement instrument, the information may include connections between the instrument and any other devices, such as other measurement instruments; and measurement data files.

In the embodiment where the instrument is a sensor, the instrument data may include the type of the sensor, its current state, the make and model of the sensor, time and/or date stamps of samples stored by the sensor of whatever parameter it is sensing, etc.

"User information" as used here will typically be gathered from the communications device. It may identify the user, provide information for a user account, such as an email account, a cloud account or other storage account, including user names and passwords. This allows the photograph, associated data, and instrument data, if separate, to be stored in that user's account.

Figure 1:
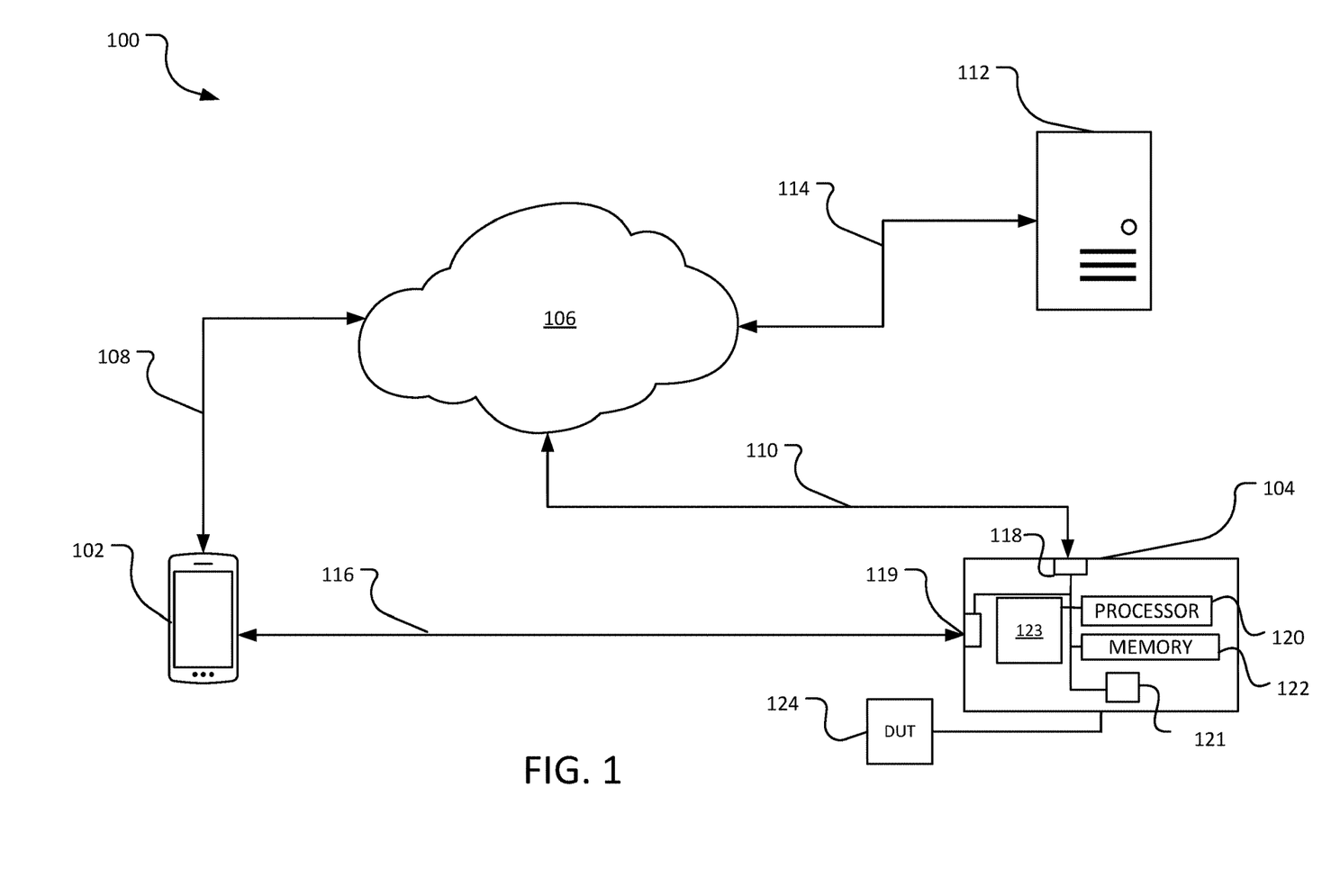
FIG. 1 is a block diagram depicting a test and measurement system according to some examples of the disclosure.

FIG. 1 illustrates a block diagram of an example system 100 according to some examples of the disclosure. In the example system 100 of FIG. 1, a communications device 102 and an instrument 104 are connected through a network 106 by communications links 108 and 110, respectively. Communications link 110 may connect to the instrument 104 through a port 118. Communications links 108 and 110 may be wired or wireless connections.

A server 112 may be a proprietary server owned by the entity that owns the instrument 104 and possibly the communication device 102, or may be a cloud server on which the entity has accounts. The server 112 can include cloud software, web application, or any other API-driven publicly available web services. The server 112 can have a database or can access a database of stored data. The server 112 includes one or more inputs for connecting to the other devices through the network 106 by connection 114 through one or more ports. In addition, the communications device 102 and the instrument 104 may have a communications link 116 through a port 119. Communications link 116 may be a wired or wireless connection. The server 112 may include an activation code generator, an authenticator, and a key generator. As discussed in more detail below, the activation code generator can generate an activation code when a request is received through the connection 114 from an instrument 104. The authenticator can authenticate a user based on information received from a communication device 102. The key generator can generate an access key for the instrument 104 to grant access to the server 112 and/or any database associated with the server 112.

The instrument 104 may have a processor 120 and a memory 122, in addition to a display 123. The figure shows the communications link 116 as being bi-directional, but as discussed below, may actually be a one-way link between the communications device 102 and the instrument 104. The instrument 104 may have user interface 121 for receiving commands, selections, or other input from a user. Also, as shown the instrument 104 may be connected to a device under test (DUT) 124.

A user can initiate an intention to connect to the server 112 through the user interface 121 of the instrument 104. During the intention to connect to the server 112, the user can also configure the connection to the server 112 with security enhancements or preferences.

For example, when the user begins to initiate the intention to connect to the server 112, the user may set configurations for the connection. Some example configurations include, but are not limited to, allowing pairing with the server 122 for a predefined period of time, not allowing the same connection from different internet protocol (IP) addresses, automatically severing the connection to the server 112 on instrument shutdown, reboot, or other instrument events, and/or providing a name, or other metadata, for the connection to the server 112. In some examples, a user may be enter exactly what IP addresses are allowed to connect, including IP address ranges.

These configuration options may be provided to the user on a menu that is displayed on the user interface 121. When the configurations are received, the instrument 104 can bundle the configurations and send a request to an API endpoint in the network 106 to retrieve a short-lived activation code. The activation code itself does not provide any access or other privileges. Rather, the activation code merely represents an opportunity to log in and reference the activation code on a communication device. If that never happens, the activation code expires after a specified amount of time or some other trigger, such as a user indicating to revoke the code on the instrument 104.

Figure 2:
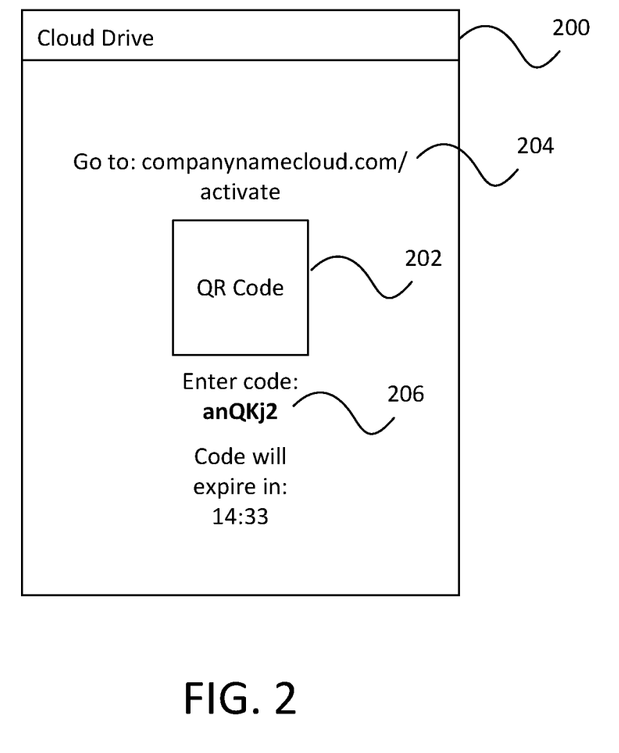
FIG. 2 is an example window that may be displayed on a user interface of a test and measurement instrument according to some examples of the disclosure.

After transmitting the request to the API endpoint, the instrument 104 receives the activation code from the API and can present the activation code to the user on the display 123. For example, the instrument 104 can display a window 200 on the display 123. The window can include the activation code, as well as the activation uniform resource locator (URL) to the user. In some examples, an expiration time for the activation code may be displayed to the user. The expiration time may include a countdown or a particular time that the activation code will no longer be valid. Additionally or alternatively, the URL may also be presented in the form of a quick response (QR) code.

FIG. 2 illustrates an example of a window 200 that may be displayed on the display 123 of the instrument 104. Examples of the disclosure, however, are not limited to this window 200 and the activation code and activation URL may be displayed in any manner to the user. Window 200 includes a QR code 202 to allow a user to quickly go to the activation URL using their communication device 102. The window 200 also shows the activation URL 204 for a user to input into the communication device 102. The activation code 206 is also provided to the user. The activation code may be any length character string, and may include numbers, letters, and/or symbols. In some examples, the activation code may be case-sensitive, as shown in FIG. 3.

Once the activation code is received by the instrument 104 and displayed on the display 123, then the instrument 104 waits for an indication from the server 112 that the user has proceeded with entering their credentials. The instrument 104 can either regularly poll the server 112 to determine if the user has completed activation and/or the instrument 104 can receive a signal from the server 112 that the activation has been completed.

Figure 3:
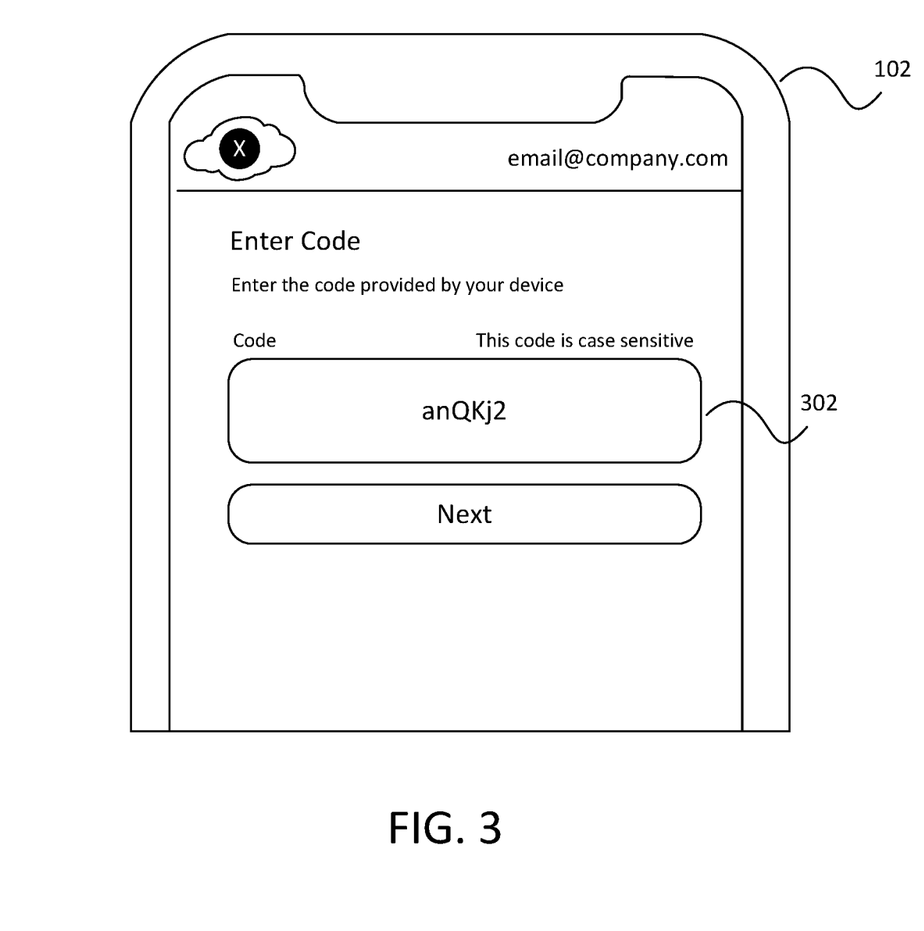
FIG. 3 is an example window that may be displayed on a communication device according to some examples of the disclosure.

FIG. 3 illustrates an example of the activation URL 204 displayed on a communication device 102. The user navigates to the specified activation URL 204 either by entering the URL into a browser or following the QR code 202. The activation website presents to a user a secure method of providing credentials along with the short-lived activation code that was displayed on the instrument 104. For example, FIG. 3 illustrates a location 302 for entering the activation code displayed on the instrument 104 at the activation URL 204 displayed on the communication device 102.

A user may provide login credentials at the activation URL 204 on the communication device 120 either before, after, or simultaneously with entering the activation code. The server 112 can receive the login credentials and the activation code and the authenticator can confirm the activation code received matches the activation code sent to the instrument and authenticate the user by the credentials. The server 112 can then associate the user with the correct instrument 104.

Upon submission of the credentials and activation code at the activation URL 204, a user may also be asked to confirm on the communication device 102 the access, preferences, and other configurations made on the instrument 104 when initiating this connection. For example, a user may be shown which instrument 104 is requesting access and what type of access is requested, such as read, write, delete, etc. This confirmation can be a security step guarding against a device attempting to gain more access than originally specified by the user on the instrument 104. The user must then confirm the activation on the communication device 102, which completes the process.

Once the login process has been completed, the instrument 104 can securely connect to the server 112 according to the privileges and preferences that were set by the system and the user. That is, the instrument 104 can receive a temporary key or other credential mechanism that provides the specific access level that was specified previously by the user.

In some examples, the instrument 104 may display the server 112 as if it is a mounted drive alongside the native C:\ drive on the instrument 104. A user can treat this connection the same as a typical drive, and the data is automatically synched to the server 112 through the network 106. Additionally or alternatively, once the instrument 104 is securely connected to the server 112, the server 112 can store instrument data, can configure instrument settings from the server 112, can provide remote processing support for the instrument 104, can provide asset management, and may distribute data to other paired instruments.

Figure 4:
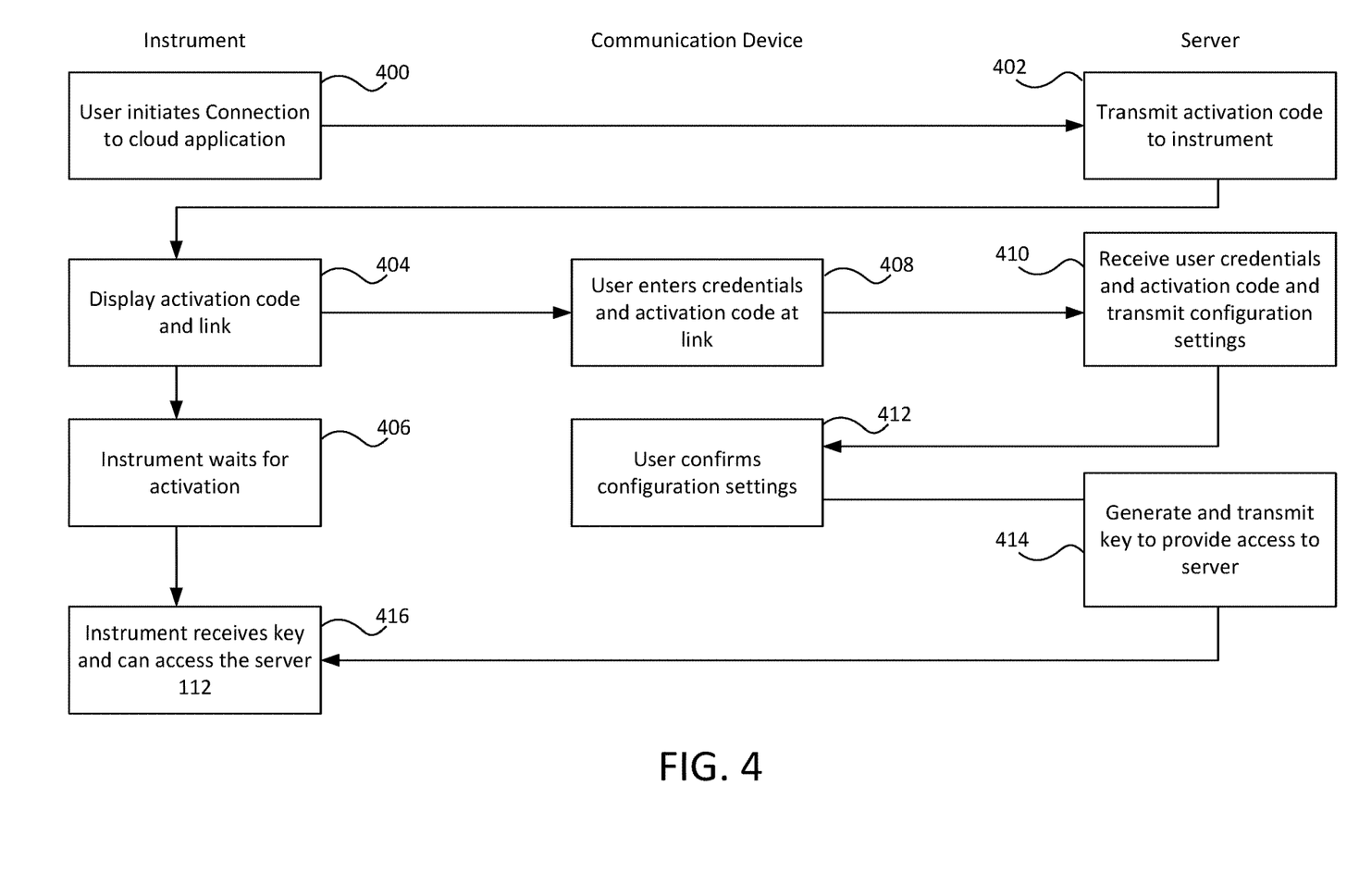
FIG. 4 is a flow chart illustrating an example operation of the test and measurement system according to some examples of the disclosure.

FIG. 4 is a flow chart illustrating the operation of connecting the instrument 104 to the server 112 using the communication device 102 according some examples of the disclosure.

Initially, in operation 400, a user initiates on the instrument 104 an intention to connect to the server 112. During this intention, in some examples, a user may also configure the connection with security enhancements or preferences, as mentioned above. For example, the user may specify allowing the connection for a specific amount of time, not allowing the same connection from different IP addresses, automatically severing the connection on reboot or other events, and/or providing a name or other metadata for the connection.

The instrument 104 then bundles the configurations set by the user and sends a request to the API endpoint at the server 112. The server 112 receives the configuration settings and the request for the connection and generates a short-lived activation code that is now associated with the instrument 104. As mentioned above, the activation code itself provides no access or other privileges to the instrument 104. The activation code represents an opportunity to log in and reference the activation code to actually create the connection to the instrument 104. The server 112 then transmits in operation 402 the activation code to the instrument 104.

In operation 404, the instrument 104 receives the activation code and can present the code to the user on the display 123 or using any other means of presenting the code to the user, such as through an audio output, LED, or an onboard communication port of the instrument 104. The code may also be presented with an activation URL, or in some examples, a user may already be aware of the activation URL and only the code is transmitted to the user.

After the activation code is presented to the user in operation 404, then instrument 104 then enters a wait mode in operation 406. The instrument 104 may periodically poll the server 112 to see if the user has completed the authentication process or may wait for a signal from the server 112 to indicate that the authentication process has been completed.

While the instrument 104 waits in operation 406, in operation 408, a user can enter the activation code at an activation URL on the communication device 102. At the activation URL on the communication device 102, a user is presented with an input text field to provide the activation code.

In operation 410, the server 112 receives and verifies the user's credentials along with the activation code. The server 112 can then associate the communication device 102 with the instrument 104. The server 112 transmits in operation 408 back to the communication device 102 the configuration settings initially sent by the user in operation 400. In operation 412, the user can confirm or change the configuration settings and/or privileges on the communication device 102 that were initially provided through the instrument 104. This confirmation is a security step that guards against a device attempting to gain more access than originally specified by the user. It can also show which instrument 104 is requesting access.

If the incorrect credentials and/or incorrect activation code are received in operation 408, the process will fail and a message may be displayed to the user on either or both the instrument 104 or the communication device 102.

In operation 414, when the user has confirmed the configuration and/or privilege settings, the server 112 can generate and transmit a temporary key or other credential mechanism to provide access to the server 112 by the instrument 104. If the instrument 104 is regularly polling the server 112 in operation 406, then the server 112 can update its status for the polling mechanism to uptake. Additionally or alternatively, the server 112 can deliver a web hook or other notification, publication, and/or subscription model method to signal to the instrument 104 that the activation is successful.

In operation 416, the instrument 104 receives the key or other credential mechanism and can now access the server 112 according to the permissions set by the user. The instrument 104 may display the connection to the server 112 as if the connection is a mounted drive and can display it in a folder system alongside the native C:\ drive, as mentioned above. This can allow a user to treat the connection the same as a typical drive for ease of use. The data is automatically synced to the server 112 based on the privileges set by the user. The connection to the instrument 104 can be scoped in many different ways to provide node-locked access levels and other security measures, as set by the user and also based on system requirements.

The connection between the server 112 and the instrument 104 is temporary and may be revocable at all times, including remotely. The server 112 can revoke access at any time without invaliding a user's credentials. Further, the server 112 may revoke access based on a configuration setting initially set by a user, such as a time period elapsing or another other event occurring, such as, but not limited to the instrument 104 rebooting or the users credentials being used for a different instrument 104. In some examples, the server 112 may revoke access based on data usage or any abuse of the system detected.

Aspects of the disclosure may operate on particularly created hardware, firmware, digital signal processors, or on a specially programmed computer including a processor operating according to programmed instructions. The terms controller or processor as used herein are intended to include microprocessors, microcomputers, Application Specific Integrated Circuits (ASICs), and dedicated hardware controllers. One or more aspects of the disclosure may be embodied in computer-usable data and computer-executable instructions, such as in one or more program modules, executed by one or more computers (including monitoring modules), or other devices. Generally, program modules include routines, programs, objects, components, data structures, etc. that perform particular tasks or implement particular abstract data types when executed by a processor in a computer or other device. The computer executable instructions may be stored on a computer readable storage medium such as a hard disk, optical disk, removable storage media, solid state memory, Random Access Memory (RAM), etc. As will be appreciated by one of skill in the art, the functionality of the program modules may be combined or distributed as desired in various aspects. In addition, the functionality may be embodied in whole or in part in firmware or hardware equivalents such as integrated circuits, FPGA, and the like. Particular data structures may be used to more effectively implement one or more aspects of the disclosure, and such data structures are contemplated within the scope of computer executable instructions and computer-usable data described herein.

The disclosed aspects may be implemented, in some cases, in hardware, firmware, software, or any combination thereof. The disclosed aspects may also be implemented as instructions carried by or stored on one or more or computer-readable storage media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Computer storage media means any medium that can be used to store computer-readable information. By way of example, and not limitation, computer storage media may include RAM, ROM, Electrically Erasable Programmable Read-Only Memory (EEPROM), flash memory or other memory technology, Compact Disc Read Only Memory (CD-ROM), Digital Video Disc (DVD), or other optical disk storage, magnetic cassettes, magnetic tape, magnetic disk storage or other magnetic storage devices, and any other volatile or nonvolatile, removable or non-removable media implemented in any technology. Computer storage media excludes signals per se and transitory forms of signal transmission.

Communication media means any media that can be used for the communication of computer-readable information. By way of example, and not limitation, communication media may include coaxial cables, fiber-optic cables, air, or any other media suitable for the communication of electrical, optical, Radio Frequency (RF), infrared, acoustic or other types of signals.

EXAMPLES

Illustrative examples of the technologies disclosed herein are provided below. A configuration of the technologies may include any one or more, and any combination of, the examples described below.

Example 1 is a server for connecting with a test and measurement instrument, comprising: one or more ports for receiving a connection request and configuration settings from a test and measurement instrument and a user-entered code and credentials from a communication device; an activation code generator configured to generate an activation code and associate the activation code with the test and measurement instrument; an authenticator configured to authenticate a user based on the credentials and determine whether the user-entered code and the activation code are identical; and a key generator configured to generate an access key when the user is authenticated and the user-entered code and the activation code are identical providing access based on the configuration settings and transmit the access key to the test and measurement instrument.

Example 2 is the server of example 1, wherein the configuration settings include a time limit for connecting the test and measurement instrument to the server, and the key generator is further configured to revoke access to the test and measurement instrument when the time limit has expired.

Example 3 is the server of either one of examples 1 or 2, wherein the configuration settings includes limiting access to the server based on one or more internet protocol addresses.

Example 4 is the server of any one of examples 1-3, wherein the configuration settings include instructions to sever the connection when an event occurs, and the key generator is further configured to revoke access to the test and measurement instrument when the event occurs.

Example 5 is the server of example 4, wherein the event is a reboot of the test and measurement instrument.

Example 6 is the server of any one of examples 1-5, wherein the configuration settings include metadata.

Example 7 is the server of any one of examples 1-6, wherein the authenticator is further configured to transmit the configuration settings to the communication device and receive a confirmation of the configuration settings from the communication device.

Example 8 is a method for securely connecting a server with a test and measurement instrument, comprising: receiving a request to connect to the server from the test and measurement instrument with configuration settings; generating an activation code and associating the activation code with the instrument; receiving user credentials and a user-entered code from a communication device; authenticating the user credentials; determining whether the user-entered code matches the activation code; and establishing a connecting with the test and measurement instrument based on the configuration settings when the user credentials are authenticated and the user-entered code matches the activation code.

Example 9 is the method of example 8, wherein the configuration settings include a time limit for connecting the test and measurement instrument to the server, and the method further includes revoking access to the test and measurement instrument when the time limit has expired.

Example 10 is the method of either one of examples 8 or 9, wherein the configuration settings includes limiting access to the server based on one or more internet protocol addresses.

Example 11 is the method of any one of examples 8-10, wherein the configuration settings include instructions to sever the connection when an event occurs, and the method further includes revoking access to the test and measurement instrument when the event occurs.

Example 12 is the method of example 11, wherein the event is a reboot of the test and measurement instrument.

Example 13 is the method of any one of examples 8-12, wherein the configuration settings include metadata.

Example 14 is the method of any one of examples 8-13, further comprising transmitting the configuration settings to the communication device and receiving a confirmation of the configuration settings from the communication device.

Example 15 is a test and measurement system, comprising: a test and measurement instrument, including a user interface configured to receive a connection request to connect to a database with configuration settings, a port configured to receive an activation code, and a display configured to display the activation code. The test and measurement instrument also includes a server for connecting with the test and measurement instrument, including one or more ports for receiving the connection request and the configuration settings from the test and measurement instrument and a user-entered code and credentials from a communication device; an activation code generator configured to generate the activation code, associate the activation code with the test and measurement instrument, and transmit the activation code to the test and measurement instrument; an authenticator configured to authenticate a user based on the credentials and determine whether the user-entered code and the activation code are identical; and a key generator configured to generate an access key for the database when the user is authenticated and the user-entered code and the activation code are identical providing access based on the configuration settings and transmit the access key to the test and measurement instrument.

Example 16 is the system of example 15, wherein the configuration settings include a time limit for connecting the test and measurement instrument to the server, and the key generator is further configured to revoke access to the test and measurement instrument when the time limit has expired.

Example 17 is the system of either one of examples 15 or 16, wherein the configuration settings includes limiting access to the server based on one or more internet protocol addresses.

Example 18 is the system of any one of examples 15-17, wherein the configuration settings include instructions to sever the connection when an event occurs, and the key generator is further configured to revoke access to the test and measurement instrument when the event occurs.

Example 19 is the system of any one of examples 15-18, wherein the configuration settings include metadata.

Example 20 is the system of any one of examples 15-19, wherein the authenticator is further configured to transmit the configuration settings to the communication device and receive a confirmation of the configuration settings from the communication device.

Example 21 is a test and measurement instrument, comprising a user interface configured to receive a connection request to connect to a database with configuration settings; a port configured to receive an activation code; and a display configured to display the activation code.

Example 22 is the test and measurement instrument of example 21, wherein the configuration settings includes limiting access to the server based on one or more internet protocol addresses, instructions to sever the connection when an event occurs, or metadata.

Example 23 is the test and measurement instrument of either one of examples 21 or 22, wherein the port is further configured to receive a key generated by a server to connect to the database and the display is configured to display the access to the server as a mounted drive.

The previously described versions of the disclosed subject matter have many advantages that were either described or would be apparent to a person of ordinary skill. Even so, these advantages or features are not required in all versions of the disclosed apparatus, systems, or methods.

Additionally, this written description makes reference to particular features. It is to be understood that all features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

Also, when reference is made in this application to a method having two or more defined steps or operations, the defined steps or operations can be carried out in any order or simultaneously, unless the context excludes those possibilities.

Although specific examples of the disclosure have been illustrated and described for purposes of illustration, it will be understood that various modifications may be made without departing from the spirit and scope of the disclosure. Accordingly, the disclosure should not be limited except as by the appended claims.

We claim:

1. A server for connecting with a test and measurement instrument, comprising:
   one or more ports for receiving a connection request and configuration settings from a test and measurement instrument and a user-entered code and credentials from a communication device;
   an activation code generator configured to generate an activation code and associate the activation code with the test and measurement instrument;
   an authenticator configured to authenticate a user based on the credentials and determine whether the user-entered code and the activation code are identical; and
   a key generator configured to generate an access key when the user is authenticated and the user-entered code and the activation code are identical providing access based on the configuration settings and transmit the access key to the test and measurement instrument.

2. The server of claim 1, wherein the configuration settings include a time limit for connecting the test and measurement instrument to the server, and the key generator is further configured to revoke access to the test and measurement instrument when the time limit has expired.

3. The server of claim 1, wherein the configuration settings include limiting access to the server based on one or more internet protocol addresses.

4. The server of claim 1, wherein the configuration settings include instructions to sever the connection when an event occurs, and the key generator is further configured to revoke access to the test and measurement instrument when the event occurs.

5. The server of claim 4, wherein the event is a reboot of the test and measurement instrument.

6. The server of claim 1, wherein the configuration settings include metadata.

7. The server of claim 1, wherein the authenticator is further configured to transmit the configuration settings to the communication device and receive a confirmation of the configuration settings from the communication device.

8. A method for securely connecting a server with a test and measurement instrument, comprising:
   receiving a request to connect to the server from the test and measurement instrument with configuration settings;
   generating an activation code and associating the activation code with the instrument;
   receiving user credentials and a user-entered code from a communication device;
   authenticating the user credentials;
   determining whether the user-entered code matches the activation code; and
   establishing a connection with the test and measurement instrument based on the configuration settings when the user credentials are authenticated and the user-entered code matches the activation code.

9. The method of claim 8, wherein the configuration settings include a time limit for connecting the test and measurement instrument to the server, and the method further includes revoking access to the test and measurement instrument when the time limit has expired.

10. The method of claim 8, wherein the configuration settings include limiting access to the server based on one or more internet protocol addresses.

11. The method of claim 8, wherein the configuration settings include instructions to sever the connection when an event occurs, and the method further includes revoking access to the test and measurement instrument when the event occurs.

12. The method of claim 11, wherein the event is a reboot of the test and measurement instrument.

13. The method of claim 8, wherein the configuration settings include metadata.

14. The method of claim 8, further comprising transmitting the configuration settings to the communication device and receiving a confirmation of the configuration settings from the communication device.

15. A test and measurement system, comprising:
a test and measurement instrument, including:
  a user interface configured to receive a connection request to connect to a database with configuration settings,
  a port configured to receive an activation code, and
  a display configured to display the activation code; and
a server for connecting with the test and measurement instrument, including:
  one or more ports for receiving the connection request and the configuration settings from the test and measurement instrument and a user-entered code and credentials from a communication device;
  an activation code generator configured to generate the activation code, associate the activation code with the test and measurement instrument, and transmit the activation code to the test and measurement instrument;
  an authenticator configured to authenticate a user based on the credentials and determine whether the user-entered code and the activation code are identical; and
  a key generator configured to generate an access key for the database when the user is authenticated and the user-entered code and the activation code are identical providing access based on the configuration settings and transmit the access key to the test and measurement instrument.

16. The system of claim 15, wherein the configuration settings include a time limit for connecting the test and measurement instrument to the server, and the key generator is further configured to revoke access to the test and measurement instrument when the time limit has expired.

17. The system of claim 15, wherein the configuration settings include limiting access to the server based on one or more internet protocol addresses.

18. The system of claim 15, wherein the configuration settings include instructions to sever the connection when an event occurs, and the key generator is further configured to revoke access to the test and measurement instrument when the event occurs.

19. The system of claim 15, wherein the configuration settings include metadata.

20. The system of claim 15, wherein the authenticator is further configured to transmit the configuration settings to the communication device and receive a confirmation of the configuration settings from the communication device.

* * * * *